United States Patent [19]
Ostler

[11] Patent Number: 4,989,217
[45] Date of Patent: Jan. 29, 1991

[54] LASER RESONATOR

[75] Inventor: Kevin Ostler, Salt Lake City, Utah

[73] Assignee: Ion Laser Technology, Salt Lake City, Utah

[21] Appl. No.: 479,077

[22] Filed: Feb. 12, 1990

[51] Int. Cl.$^5$ .............................................. H01S 3/08
[52] U.S. Cl. .................................... 372/107; 372/65; 372/92
[58] Field of Search .................... 378/107, 65; 372/92, 372/108

[56] References Cited

U.S. PATENT DOCUMENTS

| | | | |
|---|---|---|---|
| 4,203,080 | 5/1980 | Wright et al. | 372/65 |
| 4,479,225 | 10/1984 | Mohler et al. | 372/65 |
| 4,613,972 | 9/1986 | Bettman | 372/65 |
| 4,696,010 | 9/1987 | Eastman | 372/65 |
| 4,769,824 | 9/1988 | Seki | 372/65 |
| 4,896,330 | 1/1990 | Krueger et al. | 372/65 |

Primary Examiner—Leon Scott, Jr.
Attorney, Agent, or Firm—Madson & Metcalf

[57] ABSTRACT

The present invention automatically compensates for thermally induced changes in the index of refraction. This is accomplished by choosing materials from which to construct the rods such that the position of the optical elements are changed in an advantageous manner as temperatures change. For example, a pair of upper rods and a pair of lower rods are provided. The upper rods may be constructed of INVAR or other similar material with a very low coefficient of thermal expansion. The two lower rods, however, are constructed of a composite of materials having a chosen higher coefficient of thermal expansion. For example, rods may be provided which are approximately 50% to approximately 75% INVAR. The remainder of the rods are comprised of a material of a much higher coefficient of thermal expansion, such as stainless steel.

The result of such a construction is that as the temperature of the device rises, the lower rods expand at a much faster rate than do the upper rods. This results in a tilting of the end plates and a resulting tilting of the prism mounted thereto. The optical elements on the end plates are titled such that tilting compensates for the change in the index of refraction encountered by the optical element.

20 Claims, 2 Drawing Sheets

LASER RESONATOR

BACKGROUND

1. Field of the Invention

The present invention is related to an optical resonator structure which automatically compensates for changes in optical characteristics due to changes in temperature. More particularly, the present invention relates to an optical resonator structure constructed of materials having a predetermined index of thermal expansion such that changes in optical characteristics are compensated for by thermal expansion and contraction of the optical resonator structure.

2. Background of the Invention

Many optical devices are constructed in such a manner that it is critical that the optical elements within the device remain in a precise spacial arrangement. For example, the operation of lasers require that the optical elements remain in a precise location in order to assure that the laser continues to operate correctly. Likewise, in many other types of optical devices, such as microscopes, telescopes, and the like, misalignment of the optics within the device results in reduced performance of the device and the possibility of total failure of the device.

One of the problems that is encountered in modern devices, such as lasers, is that they require a significant amount of energy for their operation. This energy is usually provided in the form of electrical energy, which may then be converted to light and heat energy. For example, in the typical ion laser, atoms are excited by electrical energy to an excited ion state. The excited atoms, being inherently unstable have a tendency to return to a lower energy state. Accordingly, photons are emitted by the electrically excited atoms in order for those atoms to return to a lower energy state. During this process both heat and light energy are produced The heat must be dissipated but may be conducted off to surrounding optical components changing their index of refraction. At the same time, heating causes expansion of the various mechanical components of the laser structure resulting in misalignment of the laser.

During operation of an ion laser, the photons emitted during an induced transition of the type mentioned above have the same phase and direction as the inducing wave (i.e., they are coherent with the wave that induces the transition). A single atom may radiate a photon in any direction. However, many atoms distributed over a finite volume and radiating coherently co-operate to generate a wave having the same propagation vector as the inducing wave, within the limits of a diffraction pattern. That is, they amplify the inducing wave.

Thus, the radiation from induced emission has a spectral distribution identical to that of the inducing radiation. Also it is found that certain types of atoms produce certain specific wavelengths of radiation during the energy transition and emission of photons. For example, argon, a common substance for use in a lasing medium, produces approximately nine distinct wavelengths of radiation The most commonly used wavelengths for laser purposes are at 488 nm and 514 nm.

It will be appreciated that once a distinct wavelength of radiation is isolated, it can be used to produce a lasing action. A laser includes a lasable medium positioned between optical reflectors which reflect the optical radiation of the selected wavelength back and forth through the lasable medium to produce stimulated emission of coherent optical radiation. The reflectors define a path between the optical elements, generally referred to in the art as the laser "optical axis." The optical elements (reflectors) and the means for supporting the lasable medium along the optical axis, combined to form a space which is sometimes referred to as the "optical cavity." Typically, one of the reflectors is partially transmissive and permits some of the coherent optical radiation to escape from the resonant optical cavity to thereby provide an output laser beam of coherent radiation.

It will be appreciated that it is extremely critical that the reflectors be maintained in the precise alignment in order to reflect the coherent light energy and to maintain the lasing effect. Even slight changes in the alignment or optical characteristics of the reflectors can result in serious energy losses, wavelength changes, and other effects detrimental to the operation of the device.

It is, therefore, conventional in the art to provide means for rigidly supporting the optical elements, particularly reflectors, with respect to the remainder of the device, including the lasing medium. A number of designs of such devices are well known and conventional in the art. These structures for mounting the various components of the laser are generally referred to as resonators. Resonators generally include a structure for securely mounting the reflector, the laser medium, and any other necessary and desired components in a desired spacial relationship.

One commonly encountered feature comprises a plurality of metal alloy rods, usually constructed of a material such as INVAR ®, with a low coefficient of thermal expansion. INVAR is a nickel-iron alloy. In one formulation, known as INVAR 36, the alloy is comprised of 0.02% carbon, 0.35% manganese, 0.20% silicon, 36.00% nickel, and the remainder comprising iron. These rods are used in order to mount the various components of the laser to the laser resonator and to maintain them in a precise spatial relationship.

As was mentioned above, it is discovered in the operation of lasers that a relatively large quantity of heat is produced by the operation of the laser. In the case of ion lasers, the constant electrical excitement of the laser medium and the resulting discharge of heat energy has the tendency to heat the surrounding environment significantly. Even using materials having low coefficients of thermal expansion it is discovered that the operation of the laser is compromised due to thermal expansion or contraction of the components of the laser.

The effects of changes in temperature on the operation of an optical device such as a laser may be encountered in several different forms. For example, in a resonator comprising two facing and parallel flat reflectors, it is necessary to establish and maintain the reflectors in parallel alignment. Misalignment produces a decrease in the level of output stability.

In some types of lasers it is now preferable to employ prisms. Prisms are often used in place of or in conjunction with the maximum, high or total reflector. As the laser beam travels into the prism and is reflected back out, the prism separates the existing light wavelengths into discernible separate beams. Thus, if it is desirable to produce a laser beam having a precise wavelength of 514 nm, the light beam may be directed into a prism and the prism positioned such that only the 514 nm component of the beam travels back along the optical axis. The other wavelengths produced by excitement of argon are directed away from the optical axis by the operation of the prism.

With prisms, as with all optical components, it is found that even a small change in temperature will result in a significant change in the index of refraction of the prism. With a change in the index of refraction, there is also a change in the angle at which the various separated components of the light beam exit the prism. Thus, there may be a misalignment in that the desired portion of the light beam does not travel directly back along the optimum optical axis. It will be appreciated that even slight changes in the index of refraction can result in a reduction in efficiency of the device and a loss of power.

In order to deal with the various effects of temperature change on the operation of optical devices such as lasers, there have been developed a number of different types of devices. As discussed briefly above, one attempted solution has been to construct the resonator using materials that have very low coefficients of thermal expansion such as INVAR. Using INVAR the resonator can be held in precise alignment through a reasonable range of temperature. However, the use of INVAR does nothing to combat changes in the index of refraction of the various optical element. Thus, even using INVAR rods and components, significant loss of performance is observed.

Another attempted solution is to provide complex mechanisms for maintaining the device at a particular predetermined temperature. One type of solution has been to heat the optical components to a particular temperature that can be maintained even though lasing action is taking place. These devices are cumbersome and expensive.

It is found that even using the often complex and expensive types of devices known in the art, that optical misalignment is still encountered to a significant degree. This is particularly true when the index of refraction of the optical element must be considered, in addition to the linear alignment of the optical axis.

In the case of devices in which optical elements are used in which the index of refraction is critical, the only real means for dealing with temperature induced changes in the index of refraction is to control temperature in the complex ways discussed generally above, or to tilt the optical element in such a manner that the exiting light beam is still traveling along the desired optical axis. Titling the optical element (such as prism) is difficult to achieve without undue operator intervention or complex electro-mechanical adjustment system. In addition, when extensive operator intervention is required it is difficult to maximize the output of the device. Thus, the titling of the optical element may result in less than ideal optical alignment.

Accordingly, it will be appreciated that it would be a major advancement in the art to provide means for adequately compensating for thermally induced changes in the operation of optical equipment. In particular, it would be a major advancement in the art to provide means for compensating for changes in the index of refraction of optical elements over the range of temperatures typically encountered in any particular optical device. It would also be an advancement in the art if this type of compensation could be achieved without the necessity of employing complex and expensive heating and cooling mechanisms. It would also be an advancement in the art to provide for compensation of the effects of thermal changes simply by choosing appropriate materials for the construction of the device.

Such and methods and apparatus are disclosed and claimed herein.

BRIEF SUMMARY AND OBJECT OF THE INVENTION

The present invention is related to a uniquely constructed resonator structure for use in supporting optical elements. In particular the present invention is related to a resonator structure that is particularly adaptable for use as a support for an ion laser. More particularly, the present invention is designed to be used in cases where compensating for thermally induced changes in the index of refraction of one or more of the optical elements of the device is critical.

As discussed above, one embodiment of the device comprises a laser that employs a prism to sort frequencies of output radiation. Use of prisms of this sort are designed to result in a 100% pure frequency output from the laser. This is in contrast to typical efficiently operating lasers using only mirror that are able to produce approximately 99.8% optical purity.

The present invention teaches the construction of a resonator structure comprised of at least two spaced longitudinal members, such as rods. Those longitudinal members have predetermined coefficients of thermal expansion. The spaced longitudinal members are joined by at least one spaced transverse member, such as the end plate of a conventional laser resonator. The transverse member or members are able to support, either directly or indirectly, the necessary optical elements for operation of the laser. For example, in the typical ion laser in which the invention may be employed, one of the end plates would likely support a mirror, while the opposite end plate would support a prism.

The optical elements are aligned in such a manner as to render the device operable. The prism will be positioned at Brewster's angle with regard to the desired wavelength of light such that that frequency is reflected back along the optical axis. At the same time, the undesirable light wavelengths are sorted out and directed away from the optical axis by operation of the prism. Accordingly, a laser beam of essentially 100% purity can be achieved.

As mentioned above, the optical device, particularly if the optical device is a laser, will encounter variations in temperature during operation. This will be due to heat produced during operation as well as variations in ambient temperature. Significant changes in temperature are known to result in changes in the index of refraction of the prism. If not compensated for, these changes in the index of refraction will result in reduction of performance of the device.

The present invention, however, automatically compensates for thermally induces changes in the index of refraction. This is accomplished by choosing materials from which to construct the spaced longitudinal members such that the position of the prism is changed in an advantageous manner.

In one embodiment of the invention a pair of upper rods and a pair of lower rods are provided. Preferably the upper rods are constructed of INVAR or other similar material with a very low coefficient of thermal expansion. The two lower rods, however, are constructed of a composite of materials having a higher coefficient of thermal expansion. For example, in one embodiment of the present invention rods are provided which are approximately 50% to approximately 75% INVAR. The remainder of the material making up the rods is comprised of a material of a much higher coefficient of thermal expansion, such as stainless steel.

The result of such a construction is that as the temperature of the device rises, the lower rods expand at a faster rate than do the upper rods. This results in a tilting of the spaced transverse members (end plates) and a resulting tilting of the prism mounted thereto. The prism is positioned on the end plate such that titling of the end plate by an increase in temperature of the rods directly compensates for the thermally induced change in the index of refraction encountered by the optical element. Any combination of rods producing the desired result should be deemed as falling within the scope of the present invention.

The rods and the end plates can be positioned in the manner conventional in the laser art such that an optical cavity is created between the rods and end plates. A laser tube or other desired type of optical mechanism can then be easily positioned in the optical cavity. The power source and peripheral elements necessary for the function of the device can then be positioned as necessary.

It is, therefore, a primary object of the present invention to provide methods and apparatus for adequately compensating for thermally induced changes in the operation of optical equipment.

More particularly, it is an object of the present invention to provide a device which compensates for changes in the index of refraction over the temperature range typically encountered by the device.

It is also an object of the present invention to provide a device which compensates for thermally induced changes in the index of refraction of optics in the device without the necessity of employing complex heating and cooling mechanisms.

It is a further object of the present invention to provide a device which is capable of compensating for thermally induced changes in the index of refraction of its optics by choosing materials having appropriate coefficients of thermal expansion.

These and other objects and advantages of the present invention will become apparent upon reference to the drawings, the following description of the invention, and the appended claims.

DETAILED DESCRIPTION OF THE PREFERRED EMBODIMENTS

The present invention is related to methods and apparatus for compensating for thermally induced changes in the index of refraction of optical elements in optical devices. In particular, the present invention is related to a structure which automatically adjusts the orientation of the optical elements within the device as temperature changes. This automatic adjustment of the orientation of the optical elements results in compensation for thermally induced changes in the index of refraction of the optical elements.

Figure 1:
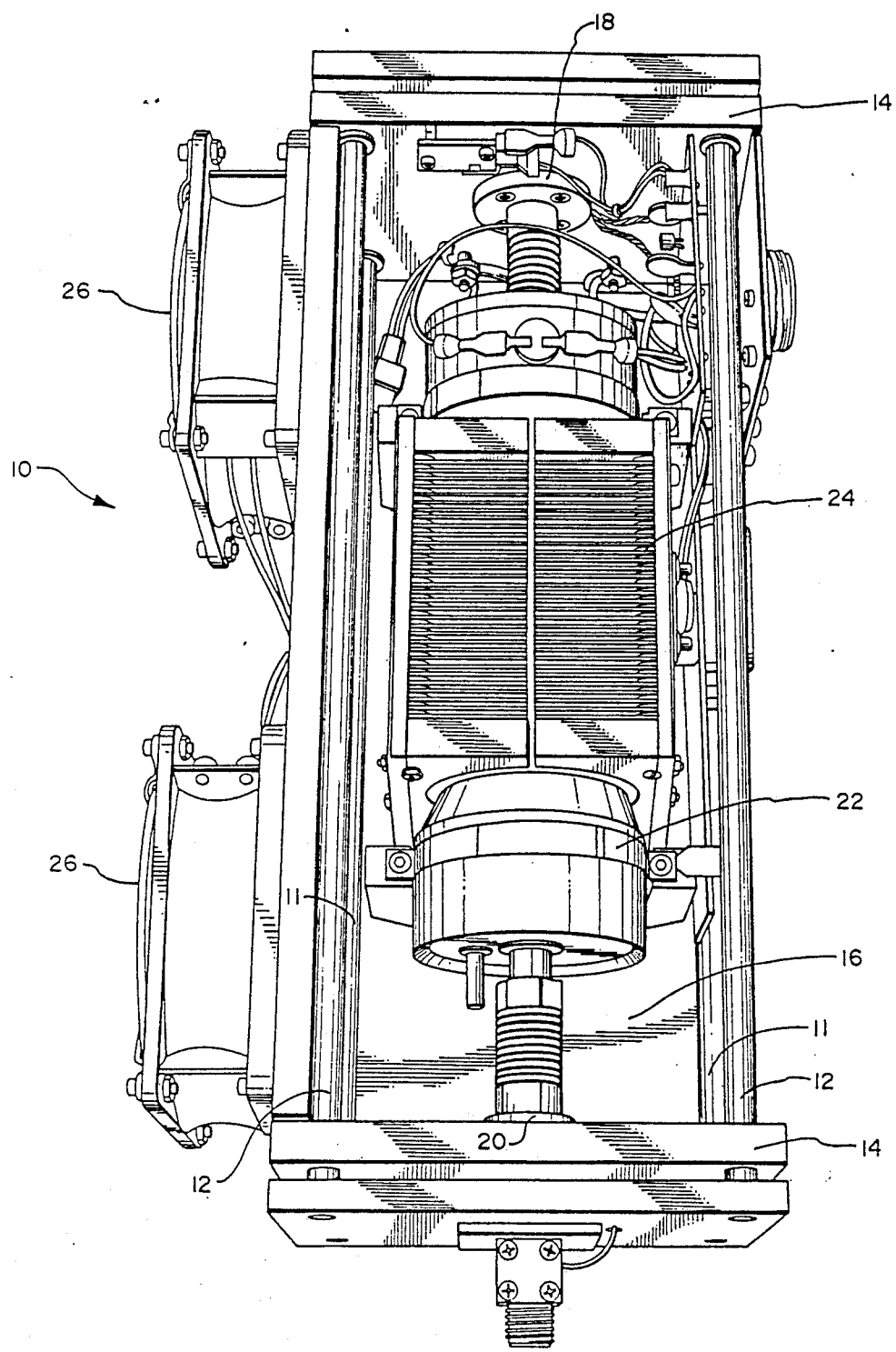
FIG. 1 is a perspective view of the interior of a laser employing the present invention.

The present invention can be more fully appreciated with reference to the drawings where like numerals designate like parts throughout. Referring now to FIG. 1, a laser resonator employing the present invention is illustrated and designated 10. While a laser resonator 10 is used to illustrate the operation of the present invention, it will be appreciated that the present invention could be advantageously employed in a wide variety of optical devices, including devices such as telescopes, microscopes and the like.

The resonator is constructed of at least two spaced longitudinal members which are shown in FIG. 1 in the form of a set of rods. As illustrated the rods run the approximate length of the resonator 10. In the illustrated embodiment there are four rods, comprising a pair of lower rods 11 and a pair of upper rods 12, and form the structural foundation of the resonator 10.

The rods 11 and 12 are joined together to form an integral structure by at least on spaced transverse member. In the illustrated embodiment there are a pair of end plates 14 which form the spaced transverse members. When the rods 11 and 12 are securely attached to the end plates 14, a laser cavity 16 is formed in the spaced defined by the rods 11 and 12 and the end plates 14.

The end plates 14 form the basis for supporting the primary optical elements of the laser. The end plate 14 on one end of the resonator 10 acts as means for supporting a mirror 18, whose operation will become more fully apparent from the discussion below. The end plate 14 on the opposite end of the resonator 10 serves as a support for a prism 20, or other similar optical element.

Located within the interior of the laser cavity 16 is a laser tube 22. The laser tube 22 can be any type of conventional laser tube. As illustrated in FIG. 1, the laser tube is an ion laser plasma tube. In one embodiment of the device the plasma tube is constructed of ceramic and metal capable of high temperature cycling. The bore material may be any type of acceptable material, such as beryllium oxide. Beryllium oxide is found to have high thermal conductivity and low sputtering characteristics and is, therefore, useful for this purpose.

It will be appreciated that the light beam necessary to produce the lasing action is achieved within the laser tube. As is well known in the art, ion lasers operate by exciting atoms or ions, such as argon, and then causing those ions to emit photons as they again return to the lower energy state. The emission of photons of a chosen frequency results in a coherent polarized light beam that can form the basis of the lasing action. This is achieved by means well known in the laser art.

Also illustrated in FIG. 1 is a mechanism for radiating heat generated by the operation of the laser tube 22, in the form of a copper heat sink 24. It may also be desirable to employ one or more fans 26 to cause cool air to flow over the heat sink 24 in order to carry accumulated heat away from the laser tube 22. The heat sink 24 is structured such that it exposes a large amount of surface area while occupying only a small space within the interior of the laser cavity 16.

Conventional electronics can be employed in order to power the various features of the laser. Indeed the present invention is useful with many known and existing laser mechanisms, as well as other optical devices. Thus, the electronics associated with the device will not be discussed in further detail.

In operation, a light beam is produced by the laser tube 22. That light beam exits the laser tube 22 at either end along the optical axis formed by the bore of the laser tube. For ease of discussion it will be assumed that the beam travels first in the direction of the mirror 18. Once the laser beam encounters mirror 18 it is reflected back along the optical axis (the horizontal axis of the laser cavity 16). The beam travels back into the laser tube 22 through the bore of the tube, initiating additional photon emission within the tube.

The beam then continues out of the tube in the direction of the prism 20. Once the beam strikes the prism 20, the beam is separated into its various component frequencies by the action of the prism 20. Thus, unwanted light frequencies can be directed away from the path of the laser beam. Indeed, it is found that when using a prism it is possible to achieve 100% purity of the light wavelength within the beam.

At this point, light of the selected wavelength is then directed back into the device, where the process is repeated numerous times. At one end of the device, the optical element is only partially reflective. As a result, a portion of the beam exits the device. This exiting beam produces the usable laser beam.

The problem that is generally encountered with this type of device, however, is heating or cooling of the various optical elements. As mentioned above, heating or cooling causes a change in the index of refraction of the various optics, including most importantly the prism 20. As a result, the beam having the desired wavelength may exit the prism 20 at an angle that is no longer ideal as the refractive index of the prism 20 changes during heating. This results in a decrease in efficiency of the laser and may even lead to failure of the laser if the path of travel of the chosen beam no longer corresponds to the optical axis and the bore of the laser tube.

In order to compensate for the change in the index of refraction it has been found that if the rods 11 and 12 are constructed of carefully chosen materials, thermal expansion of the rods will compensate for thermally induced changes in the index of refraction of the optical elements. In one embodiment, the lower rods 11 are constructed such that they have a high coefficient of thermal expansion than do the upper rods 12. As a result, as he temperature within the resonator 10 increases, the lower rods 11 expand or contract to a greater degree than do the upper rods 12. This causes the end plates 14 to be tilted (i.e., the lower portion of the end plates are forced outwardly). The degree of tilting is selected such that it compensates directly for the change in the index of refraction of the prism when the prism is properly mounted on the end plate 14. Thus, the laser beam continues to travel through the bore of the laser tube 22 along the optical axis, and operation of the laser continues.

Figure 2:
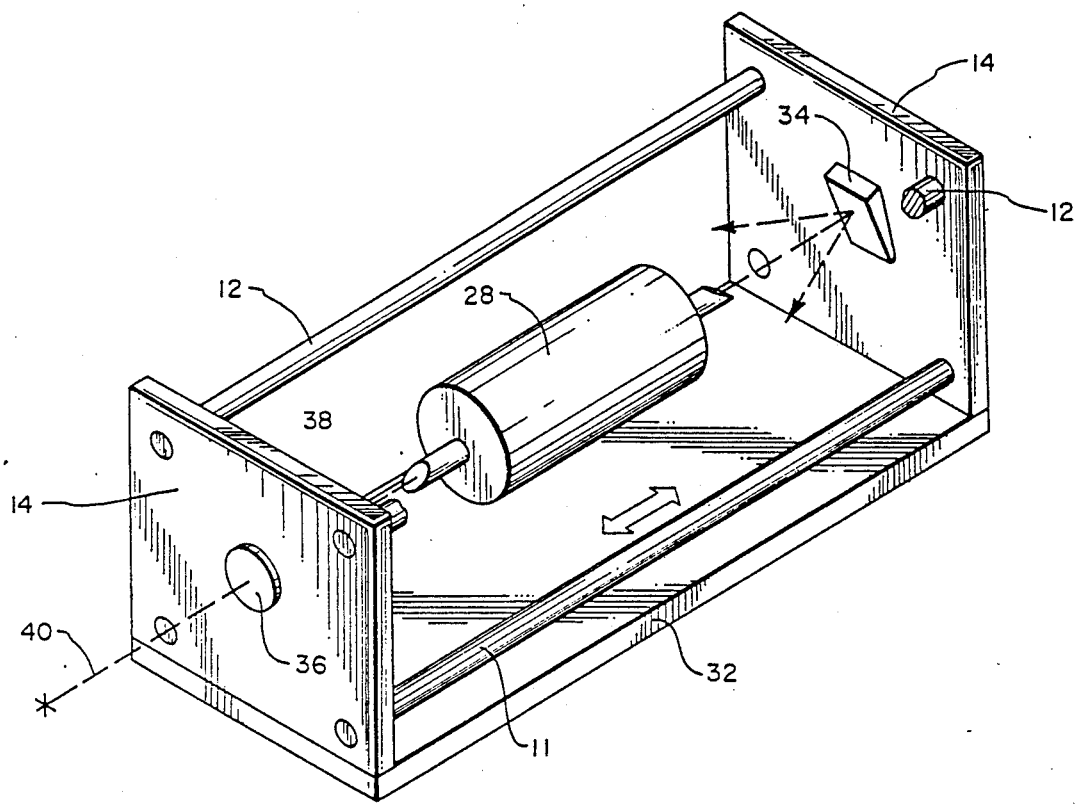
FIG. 2 is a partially cut away perspective view illustrating a laser resonator before operation employing the present invention.

The operation of the present invention can be more fully appreciated with reference to FIG. 2. In FIG. 2, only the elements of the laser necessary to illustrate operation of the invention are shown. FIG. 2 illustrates a pair of upper rods 12 and a pair of lower rods 11. Also illustrated in FIG. 2 are a pair of spaced transverse members in the form of end plates 14. A laser tube 28 is shown within the interior of the laser cavity 30. Also illustrated is a base 32 which is also attached to the end plates 14. Securely attached to one end plate 14 is prism 34, while a mirror 36 is attached to the opposite end plate 14.

The general operation of the laser can be readily appreciated from FIG. 2. The laser tube 28 produces a quantity of light that travels out of the laser tube 28 along the optical axis 38 as directed by the bore. As the laser beam 40 strikes the prism 34, the beam is separated into is component wavelengths by the normal prism effect. This is illustrated by the dotted lines terminating in arrows B and C. The unwanted frequencies are deflected in a variety of directions as is shown. However, the wavelength that is desired travels back along the optical axis 38 into the laser tube 28 and forms laser beam 40.

Once the beam 40 again enters the laser tube 28, the beam is instrumental in causing additional emission of photons from the excited ions or molecules contained within the laser tube, as is well known to those skilled in the art of ion lasers. As a result, an enhanced beam of the chosen wavelength leaves the laser tube 28, traveling in the direction of the mirror 36. In a typical laser, the mirror 36 will be partially reflective. As a result, a portion of the coherent beam exits the device to form the usable laser beam. The remainder of the beam is reflected and repeats the course outlined above.

It is apparent that if the index of refraction of the prism is altered because of a change in the temperature (typically due to changes in ambient conditions or environment), at least a portion of the beam containing the desired frequency will not exit the prism precisely along the optical axis 38. This will result in a reduction in the efficiency of operation of the laser, and distortion or wander of the laser beam, and could prevent significant lasing action.

Figure 3:
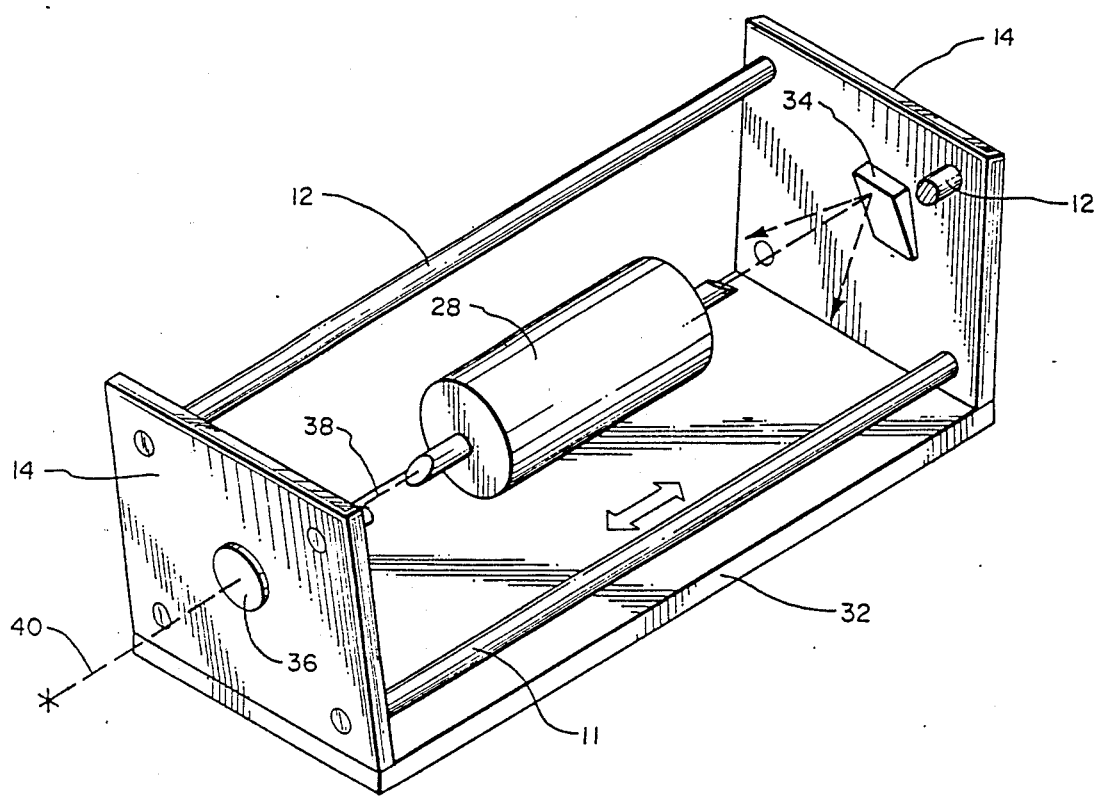
FIG. 3 is a partially cut away perspective view illustrating the laser resonator of FIG. 2 during operation.

In order to overcome the problem which results if the index of refraction of the optical elements change without compensation, the present invention provides a mechanism for automatic compensation for such changes in optical properties. In particular, the present invention teaches constructing the upper rods 12 and lower rods 11 in such a manner that they have different coefficients of thermal expansion. In one embodiment of the device, the upper rods 12 have a higher coefficient of thermal expansion than do the lower rods 11. As a result, as the temperature of the resonator goes up, the end plates 14 are slightly tilted due to uneven expansion of the rods. The upper rods 12 move the upper portion of the end plates 14 outwardly with respect to the lower rods 11. This condition is illustrated generally in FIG. 3.

The result is that the difference in the expansion of upper rods 12 and lower rods 11 tilts the prism 34 sufficiently to compensated for the change in the index of refraction. This assures that the subject beam exiting the prism along the optical axis of the laser tube 28 will continue to travel in the desired direction.

In one embodiment of the device, the lower rods 11 are constructed primarily, if not exclusively of INVAR, an alloy that is used extensively in the laser industry. While INVAR is used to illustrate the present invention, any other similar material having a low coefficient of thermal expansion could be used. INVAR is found to have a very low coefficient of thermal expansion. As mentioned above INVAR is a nickel-iron alloy generally comprising approximately 36.00% nickel, 0.02% silicon, with the remainder being iron.

The upper rods 12, conversely, are constructed of a mixture of INVAR and a substance having a higher coefficient of thermal expansion, such as stainless steel. The amount of stainless steel added to the upper rods many vary depending on the precise structure of the resonator. However, it has been found that upper rods 12 containing from about 28% to about 50% stainless steel have provided good results. In 14 inch rods, the addition of from about 4 to about 7 inches of stainless has been found to provide good results when coupled with a prism constructed of fused silica. Typical stainless steel has a coefficient of thermal expansion of approximately 166 (in/in/°C.×10$^7$ at 25°-100° C.).

The device as described above has been found to provide good results over a wide temperature range. The range covers the usual temperatures encountered in the operation of conventional lasers. In particular, the present invention is observed to give good results (i.e. essentially perfect alignment) from about 60° F. to well over 100° F.

As mentioned above, FIG. 3 illustrates the same device as that shown in FIG. 2, except that the temperature has been raised. As can be observed, the increase in temperature results in expansion of the upper rods 12, with little noticeable expansion of the lower rods 11. This expansion has resulted in a tilting of the end plate and the attached prism 34. Thus, even though the index of refraction of the prism has changed, the slight tilting of the end plates has compensated for the change and the selected light wavelength continues to travel along the optical axis 38.

Thus, it will be appreciated that all of the objects of the invention have been accomplished. The device of the present invention easily and conveniently compensates for changes in the index of refraction of the optical elements of the optical device, without the necessity of constant adjustment by the operator. This compensation occurs over the entire temperature range typically encountered in conventional lasers. The compensation for temperature variations occurs without the necessity of complex air circulation devices, heating and cooling mechanisms, and mechanical structures. All of these objects are accomplished by simply selecting rods having the desired coefficients of thermal expansion such that expansion of the rods compensates for the changes in the optics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be considered to be embraced within their scope.

What is claimed and desired to be secured by United States Letters Patent is:

1. An apparatus for supporting optical elements, which apparatus compensates for changes in the index of refraction of those elements over a predetermined range of temperature, said apparatus comprising:
   at least two spaced longitudinal members having predetermined individual coefficients of thermal expansion, said longitudinal members being joined by at least one spaced transverse member, said at least one spaced transverse member being capable of supporting at least one optical element in an operable alignment such that thermal expansion of said longitudinal members results in a change in the alignment of said optical element which compensates for thermally induced changes in the refractive index of said at least one said optical element.

2. An apparatus for supporting optical elements, which apparatus compensates for changes in the index of refraction of those elements over a predetermined range of temperature as defined in claim 1 wherein the longitudinal members comprise rods.

3. An apparatus for supporting optical elements, which apparatus compensates for changes in the index of refraction of those elements over a predetermined range of temperature as defined in claim 2 wherein said apparatus comprises a pair of upper rods and a pair of lower rods.

4. An apparatus for supporting optical elements, which apparatus compensates for changes in the index of refraction of those elements over a predetermined range of temperature as defined in claim 3 wherein the upper rods have a higher coefficient of thermal expansion than the lower rods such that the angle of said spaced transverse member changes with respect to the remainder of the device as the temperature of the device changes.

5. An apparatus for supporting optical elements, which apparatus compensates for changes in the index of refraction of those elements over a predetermined range of temperature as defined in claim 4 wherein the change in the angle of the transverse member corresponds to the change in the index of refraction of the optical element in such a way that changes in the angle of the transverse member compensate for changes in the index of refraction of the optical element.

6. An apparatus for supporting optical elements, which apparatus compensates for changes in the index of refraction of those elements over a predetermined range of temperature as defined in claim 1 wherein said optical element comprises a prism.

7. An apparatus for supporting optical elements, which apparatus compensates for changes in the index of refraction of those elements over a predetermined range of temperature as defined in claim 6 wherein said apparatus comprises a laser.

8. A resonator for containing the optical elements of a laser comprising:
   a plurality of spaced, essentially parallel, longitudinal rods, said rods having individual predetermined coefficients of thermal expansion;
   at least two end plates spaced transverse to, intersecting, and attached to the rods;
   at least one optical element attached in operable alignment to at least one of said end plates wherein the thermal expansion of the rods, and the resulting forces exerted on said end plates, result in a realignment of said end plates which essentially compensates for the thermally induced change in the index of refraction of said optical element.

9. An apparatus for supporting optical elements as defined in claim 8 wherein said spaced longitudinal members comprise rods.

10. An apparatus for supporting optical elements as defined in claim 9 wherein said apparatus comprises a pair of lower rods and a pair of upper rods.

11. An apparatus for supporting optical elements as defined in claim 10 wherein said upper rods are constructed of a material having a coefficient of thermal expansion of the lower rods.

12. An apparatus for supporting optical elements as defined in claim 10 wherein the upper rods are constructed essentially of INVAR.

13. An apparatus for supporting optical elements as defined in claim 10 wherein the lower rods are constructed of a mixture of INVAR and an additional substance having a coefficient of thermal expansion greater than INVAR.

14. An apparatus for supporting optical elements as defined in claim 13 wherein the substance having a coefficient of thermal expansion greater than INVAR comprises stainless steel.

15. An apparatus for supporting optical elements as defined in claim 8 wherein the at least one spaced transverse member comprises an end plate.

16. An apparatus for supporting optical elements as defined in claim 15 wherein said apparatus comprises two end plates, each attached to the ends of the longitudinal members.

17. An apparatus for supporting optical elements as defined in claim 16 wherein said apparatus is capable of containing within said end plates and said longitudinal members a lasing medium.

18. An apparatus for supporting optical elements as defined in claim 17 wherein said lasing medium comprises a laser tube.

19. An apparatus for supporting optical elements as defined in claim 18 wherein a prism is attached to the interior surface of at least one of said end plates.

20. An apparatus for supporting optical elements as defined in claim 19 wherein a mirror is attached to the interior surface of at least one of said end plates.

* * * * *